(12) United States Patent
Bagley et al.

(10) Patent No.: US 7,976,417 B2
(45) Date of Patent: Jul. 12, 2011

(54) WHISTLE BALL

(75) Inventors: Justin A. Bagley, Seattle, WA (US);
Joseph W. Kent, Brooklyn, NY (US);
Mark J. Oblack, Issaquah, WA (US);
Kyle D. Burger, Seattle, WA (US)

(73) Assignee: Canine Hardware Inc., Kent, WA (US)

( * ) Notice: Subject to any disclaimer, the term of this patent is extended or adjusted under 35 U.S.C. 154(b) by 103 days.

(21) Appl. No.: 12/370,445

(22) Filed: Feb. 12, 2009

(65) Prior Publication Data

US 2010/0203987 A1 Aug. 12, 2010

(51) Int. Cl.
*A63B 43/00* (2006.01)
(52) U.S. Cl. .................................... 473/571; 473/613
(58) Field of Classification Search .............. 473/571, 473/570, 594, 613; 446/297, 397, 404, 409; 119/707
See application file for complete search history.

(56) References Cited

U.S. PATENT DOCUMENTS

| | | | |
|---|---|---|---|
| 495,863 A | 4/1893 | Whitzel | |
| 992,343 A | 5/1911 | Dils | |
| 1,193,992 A * | 8/1916 | Cigol | 473/571 |
| 2,003,957 A * | 6/1935 | Salisbury | 446/409 |
| 2,687,302 A * | 8/1954 | Stiegler | 473/571 |
| 3,198,526 A | 8/1965 | Smith | |
| 5,033,743 A | 7/1991 | Wright | |
| 5,158,284 A | 10/1992 | Vogl | |
| 5,253,866 A * | 10/1993 | Moorman et al. | 473/571 |
| 5,280,906 A | 1/1994 | Vitale | |
| 5,399,136 A | 3/1995 | Bart | |
| 5,451,046 A | 9/1995 | Batton | |
| 5,700,211 A | 12/1997 | Mackie | |
| 5,816,885 A | 10/1998 | Goldman | |
| 6,068,534 A | 5/2000 | Strongin | |
| 6,076,829 A | 6/2000 | Oblack | |
| 6,123,599 A | 9/2000 | Chiang | |
| 6,609,944 B1 | 8/2003 | Viola | |
| 6,679,927 B2 | 1/2004 | Strongin | |
| D497,191 S | 10/2004 | Shore | |
| 6,892,674 B1 | 5/2005 | Dubinins | |
| 2003/0008727 A1* | 1/2003 | Miller | 473/571 |
| 2007/0295283 A1 | 12/2007 | Gick | |

* cited by examiner

*Primary Examiner* — Steven Wong
(74) *Attorney, Agent, or Firm* — Christensen O'Connor Johnson Kindness PLLC (57) ABSTRACT

A ball includes a body having an outer surface. A chamber is disposed within the body and has a concave curvature in at least two orthogonal directions. An aperture defines a fluid connection between the chamber and the outer surface of the ball. Air flow across the aperture produces a whistling sound.

8 Claims, 11 Drawing Sheets

WHISTLE BALL

BACKGROUND

Among the available types of pet toys, balls remain a popular option. In order to enhance the pet's enjoyment of the ball, it is desirable to maximize the stimulation provided by playing with the ball. One way to do so is to configure the ball such that is provides audible stimulation in addition to the normal visual and tactile stimulation. Some balls are known to produce a noise when thrown, but such balls generally include a separate noisemaker attached to the ball. Such balls are costly to manufacture and can be prone to breakage when subjected to the stresses inherent with typical play. Other balls include integral noisemakers formed therein to produce a squeaking noise when the balls are squeezed. Because a flow of air is required to pass through the noisemaker to produce the squeaking sound, these balls generally do not produce a noise when thrown. The presently disclosed ball represents a unique, one-piece ball that produces a whistling noise when thrown.

SUMMARY

One disclosed ball includes a body having an outer surface. A chamber is disposed within the body and has a concave curvature in at least two orthogonal directions. The ball further includes an aperture disposed in the body to define a fluid connection between the chamber and the outer surface. A flow of air across the aperture produces a whistling sound.

Another disclosed ball has a body having an outer surface and a chamber disposed within the body. The chamber includes a frusto-conical first portion and a second portion having a concave curvature in at least two orthogonal directions. An aperture is disposed in the body and is in fluid connection with the chamber and the outer surface. A flow of air across the aperture produces a whistling sound.

Also disclosed is a method of launching a ball using a launching apparatus to produce a whistling sound. The ball has one or more apertures that produce a whistling sound when a flow of air passes over the one or more apertures. The disclosed method includes the step of inserting the ball into a holder disposed on the launching apparatus so that the ball is retained in the holder. The method further includes moving the launching apparatus from a first position toward a second position. As the launching apparatus approaches the second position, the momentum of the ball releases the ball from the holder. The released ball continues to move along a trajectory, and movement of the ball along the trajectory creates an airflow across the one or more apertures to produce a whistling sound.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

For clarity in the following description, directional terms such as top, bottom, side, rear, etc. have been used to describe suitable embodiments of the disclosed ball. However, it will be appreciated that the features of the described embodiments may be positioned in various orientations, and thus, the directional terms will change accordingly. Therefore, such terms should be viewed as merely descriptive and non-limiting.

FIGS. 1-6 show a first exemplary embodiment of ball 100 according to the presently disclosed subject matter. The ball 100 includes a substantially spherical body 102 having an outer surface 104. The surface includes a plurality of grooves formed thereon. A first groove 106 comprises an endless loop that divides the surface 104 into two substantially equal portions, similar to the seam of a baseball, wherein each portion includes two rounded ends joined by a narrow strip with two concave edges. Second and third grooves 108 and 110 are disposed on the left and right sides of the ball, respectively, and have a teardrop-shaped contour. The illustrated grooves are generally ornamental in nature, and as such, should be considered optional. Further, it should be appreciated that the shape, number, and orientation of the grooves of the illustrated embodiment are exemplary and should not be considered limiting. Other embodiments having more grooves, less grooves, or no grooves at all are contemplated and should be considered within the scope of the disclosed subject matter.

The ball 100 is preferably formed from a polymeric material. In the preferred embodiment, the polymeric material has a modulus of elasticity such that the ball 100 elastically deforms during normal use, but still has sufficient strength and durability. It will be appreciated that other materials having sufficient strength and durability may be also used. The use of such materials should be considered within the scope of the present disclosure.

Figure 6:
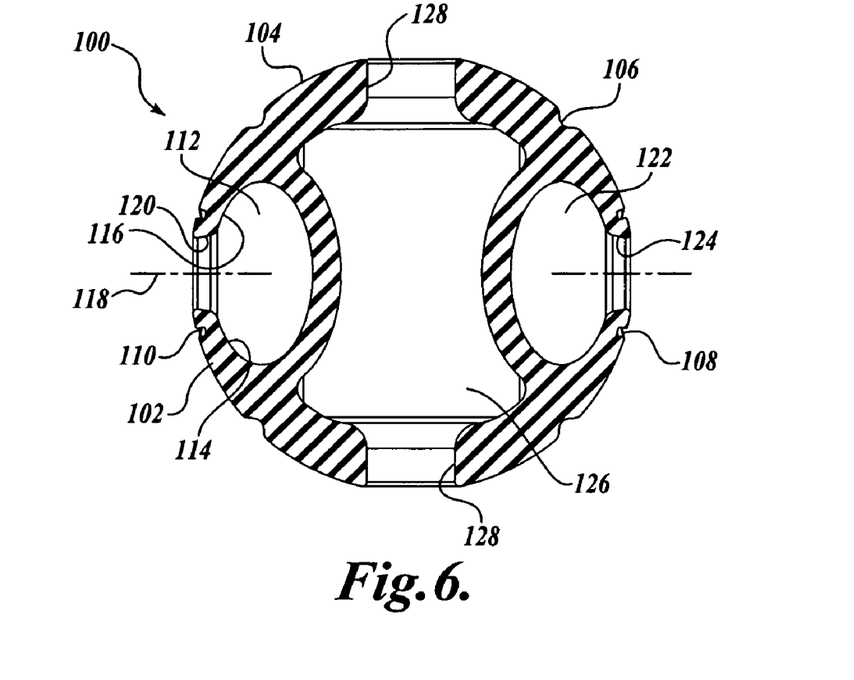
FIG. 6 shows a cross-sectional view of the ball shown in FIG. 1.

Referring to FIG. 6, a chamber 112 is formed within the body 102 near the outer surface 104. In the illustrated embodiment, the chamber 112 is at least partially defined by a surface 114 having a concave curvature in at least two orthogonal directions. In the illustrated embodiment, the surface 114 is defined by rotating a concave arc 116 about an axis of rotation 118. As a result, the intersection of the surface 114 and a plane containing the axis of rotation 118 is a concave curve. Further, the intersection of the surface 114 and a plane normal to the axis or rotation 118 is also a concave curve. The chamber 112 shown in FIG. 6 is shaped such that a cross-section taken through a plane that contains the axis of rotation 118 has a generally elliptical shape, wherein the major axis is approximately twice as long as the minor axis.

It should be appreciated that the shape of the chamber 112 illustrated in FIG. 6 is exemplary, and should not be considered limiting. Alternate embodiments are envisioned wherein the elliptical cross-section is such that the ratio of the major axis to the minor axis is approximately 5:4, 3:2, 7:4, or any other suitable ratio. Further, the chamber 112 need not have an elliptical cross-section, but can instead have a cross-section that is circular or any other suitable concave shape. In this regard, the cross section can comprise a complex curve that includes both flat and curved potions.

Figures 1, 2, 3:
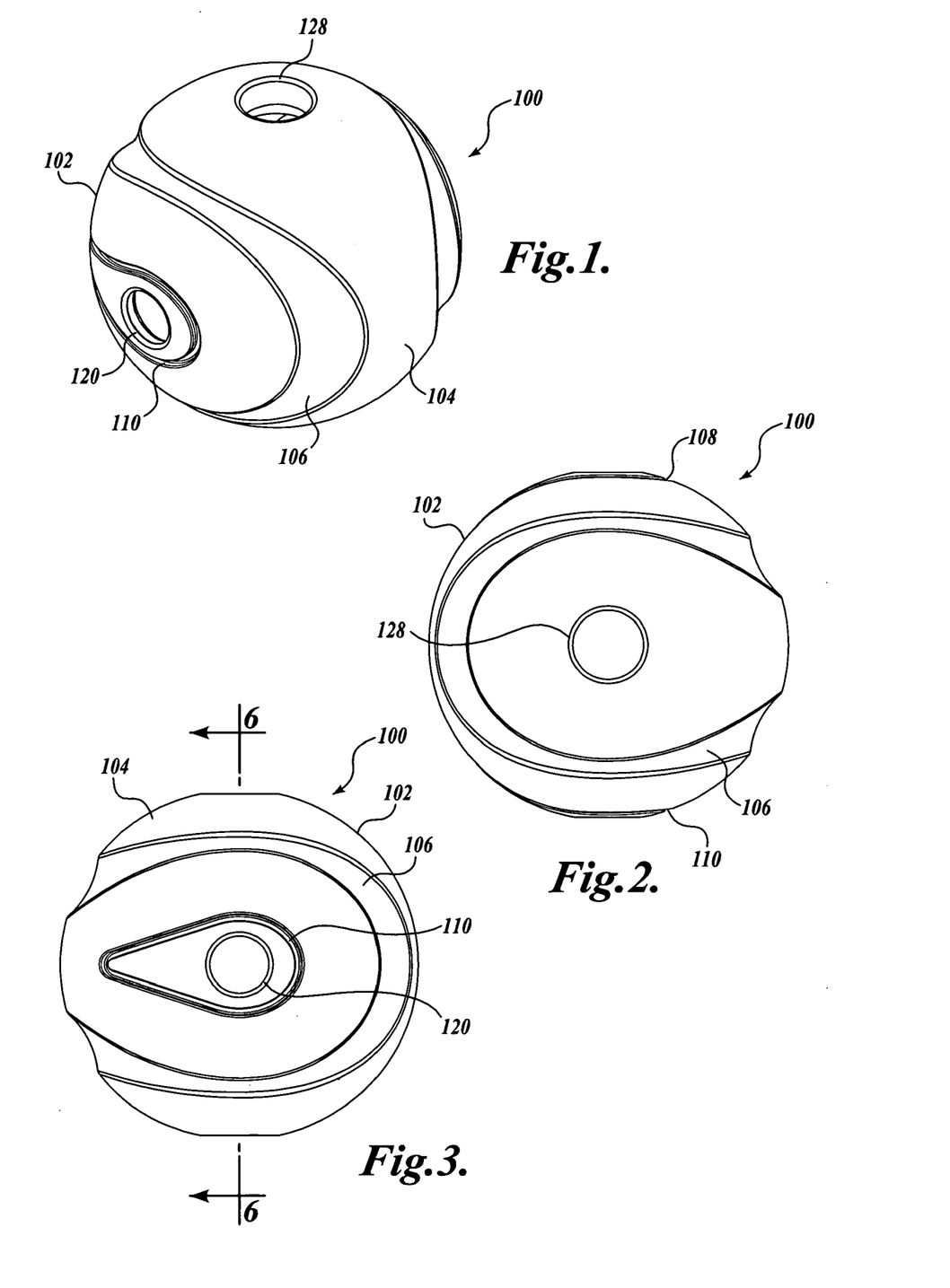
FIG. 1 shows an isometric view of a ball in accordance with a first exemplary embodiment of the disclosed subject matter.
FIG. 2 shows a top view of the ball shown in FIG. 1.
FIG. 3 shows a side view of the ball shown in FIG. 1.
Figure 4:
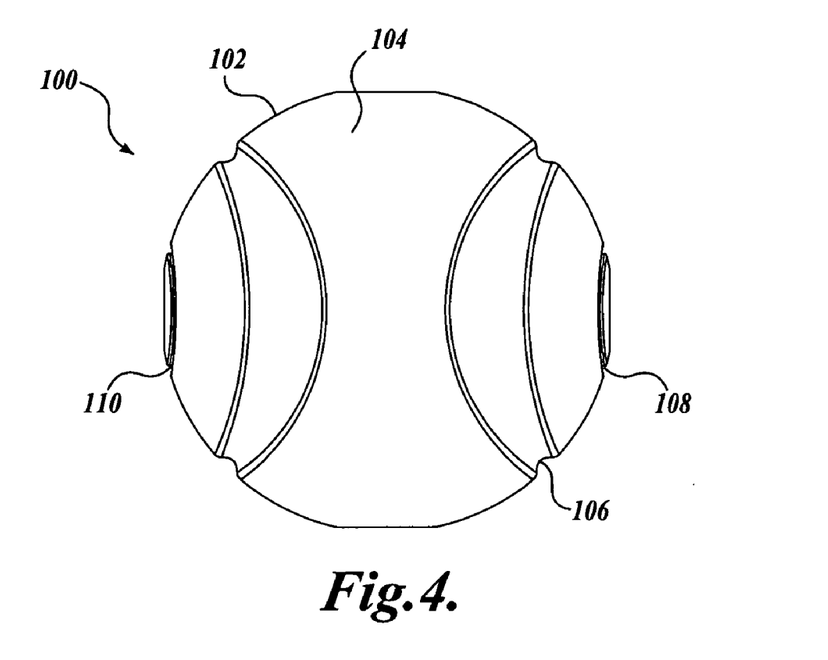
FIG. 4 shows a front view of the ball shown in FIG. 1.
Figure 5:
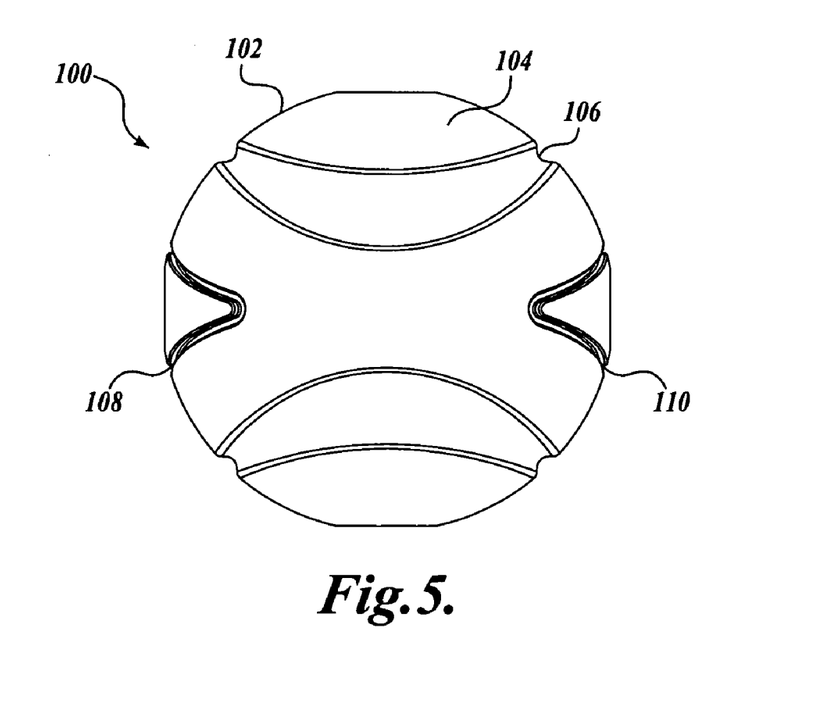
FIG. 5 shows a rear view of the ball shown in FIG. 1.

An aperture 120 is formed in the body 102 to connect the chamber 112 to the outer surface 104 of the body 102; that is, the aperture puts air in the chamber 112 in fluid connection with air surrounding the ball 100. As shown in FIGS. 1 and 3, the aperture 120 of the illustrated embodiment is preferably round, with a centerline that corresponds to the axis of rotation 118 of the chamber 112. It should be appreciated that the aperture 120 need not be round. In this regard, alternate embodiments are contemplated wherein the aperture is square, elliptical, or any other suitable shape.

Still referring to FIG. 6, a second chamber 122 is formed within the body 102 opposite the first chamber 112. Similar to the interior portion of the first chamber 112, the interior portion of the second chamber 122 is in fluid connection to air outside of the ball 100 by way of an aperture 124 connecting the chamber 122 to the outer surface 104 of the body 102. In the illustrated embodiment, the second chamber 124 and the second aperture 124 are symmetric to the first chamber 112 and the first aperture 120 with respect to a vertical plane of symmetry that bisects the ball 100.

The body 102 further includes a cavity 126 formed in a central portion of the body 102. As best shown in FIG. 6, the cavity 126 is formed so that the thickness of the walls that separate the cavity 126 from the first and second chambers 112 and 124 have an approximately constant thickness. In the illustrated embodiment, the shape of the cavity 126 is such that the portion of the body 102 between the outer surface 104 and the cavity 126 also has an approximately constant thickness. Apertures 128 are disposed in the top and the bottom of the body 102 to provide a fluid connection between the cavity 126 and the outside of the body 102.

The embodiment shown in FIG. 6 is exemplary only. It should be appreciated that variations in the size, shape, and number of chambers and cavities may vary according to manufacturing requirements, the desired sound to be produced when the ball is thrown, or the desired stiffness and weight of the ball. In some alternate embodiments, the size and/or shape of the cavity 126 may be modified to result in thicker wall sections, thereby increasing both the weight and stiffness of the ball. In other embodiments, the apertures that connect the cavity 126 to the outside of the body 102 may be moved, have their numbers reduced or increased, or be eliminated altogether. Further, the single cavity 126 shown in FIG. 6 may be replaced by two or more smaller cavities. In other contemplated embodiments, the body 102 does not include a cavity 126, but instead has a solid center portion. These and other variations are contemplated and should be considered within the scope of the present disclosure.

When the ball 102 is thrown or otherwise propelled through the air, an air stream passes over the surface 104 of the body 102 and, more specifically, over the apertures 120 and 124 in the body 102. The passage of the air stream over the apertures 120 and 124 produces a whistling noise.

The size, number, and shape of the chambers formed in the body can affect the weight and stiffness of the ball, as well as the sound produced when the ball is thrown. Accordingly, various alternate embodiments are contemplated wherein the ball is configured to provide particular properties.

Figure 7:
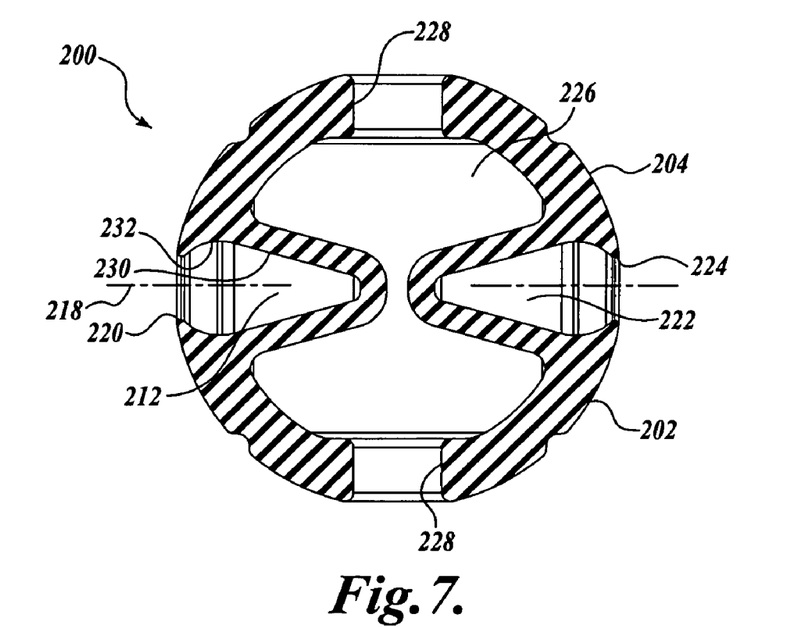
FIG. 7 shows a cross-sectional view of a ball in accordance with a second exemplary embodiment of the disclosed subject matter.

FIG. 7 shows one such alternate embodiment. In this first alternative embodiment, the ball 200 is similar to the ball 100 illustrated in FIGS. 1-6, wherein features indicated by reference numbers 2xx in FIG. 7 correspond to similar features indicated by reference numbers 1xx in FIG. 6. In this regard, the ball 200 includes a body 202 having a plurality of chambers 212 and 222, a plurality of apertures 220 and 224 providing fluid communication between the chambers and an area outside of the body 202, and a central cavity 226.

The ball 200 shown in FIG. 7 differs from the ball 100 shown in FIG. 6 in that the chambers 212 and 222 have a shape that differs from the shape of the chambers 112 and 122 of the first embodiment. More specifically, each of the chambers 112 and 122 comprises an interior frustoconical portion formed by rotating a substantially straight line 230 around an axis of rotation 218. Each chamber further comprises a rounded portion disposed between the frustoconical portion and the outer surface 204 of the body 202 formed by rotating a concave arc 232 about the axis of rotation 218. Because chambers 212 and 222 have different sizes and shapes than chambers 112 and 222, throwing the ball 200 produces a whistling noise having different characteristics than is produced by throwing ball 100.

Still referring to FIG. 7, the cavity 226 is shaped so that the portion of the body 202 between the chamber and each cavity forms a wall having a substantially constant thickness. Similar to the embodiment shown in FIG. 6, an aperture 228 is formed in each of the upper and lower portion of the body 202 to provide fluid communication between the cavity 226 and an area outside of the body 202.

Figure 8:
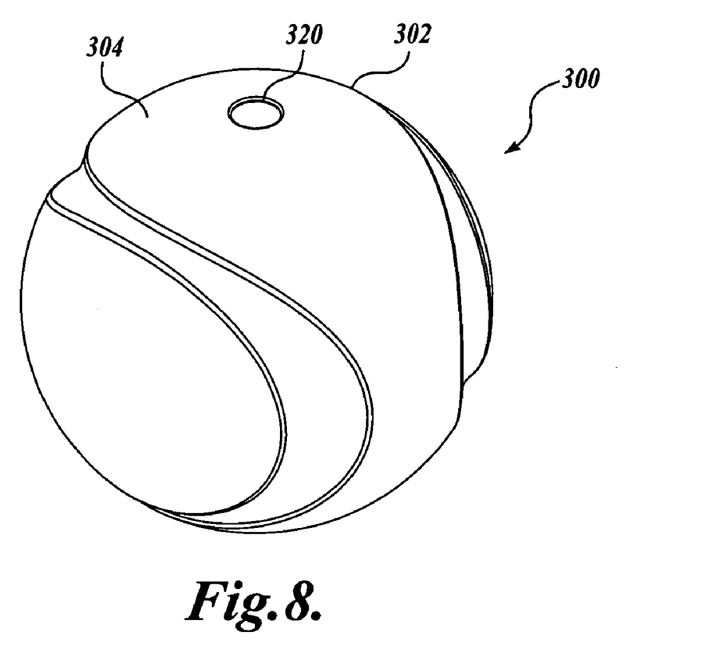
FIG. 8 shows an isometric view of a ball in accordance with a third exemplary embodiment of the disclosed subject matter.
Figure 9:
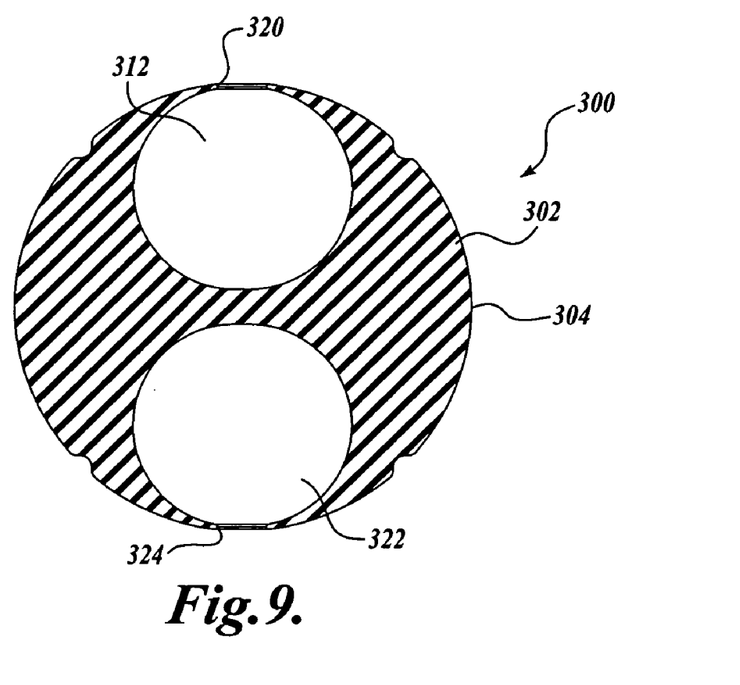
FIG. 9 shows a cross-sectional view of the ball shown in FIG. 8.

A second alternate embodiment is shown in FIGS. 8 and 9. The illustrated ball 300 has a body 302 having a generally spherical surface 304. Referring to FIG. 9, first and second chambers 312 and 322 are formed in the body 302. The chambers have a substantially spherical shape, and a pair of apertures 320 and 324 are formed in the body 302 to put the chambers 312 and 322, respectively, in fluid communication with an area outside of the outer surface 304 of the ball 300.

Figure 10:
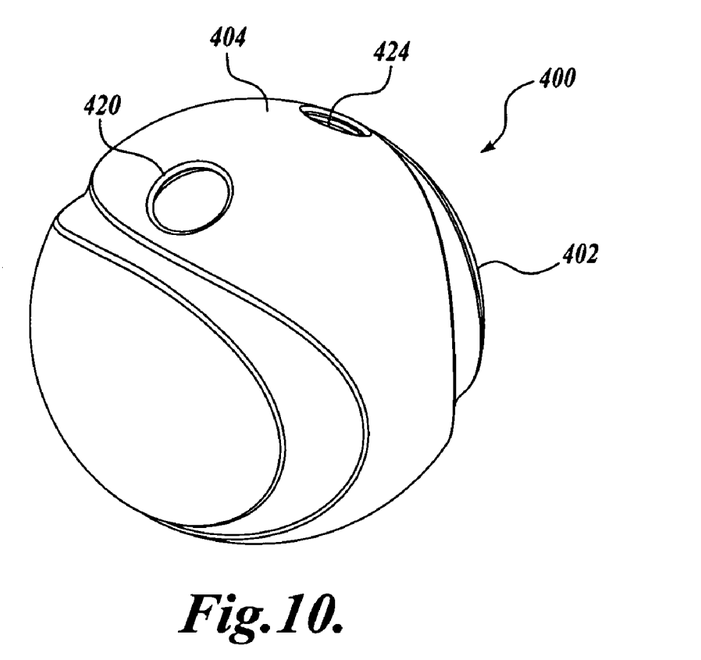
FIG. 10 shows an isometric view of a ball in accordance with a fourth exemplary embodiment of the disclosed subject matter.
Figure 11:
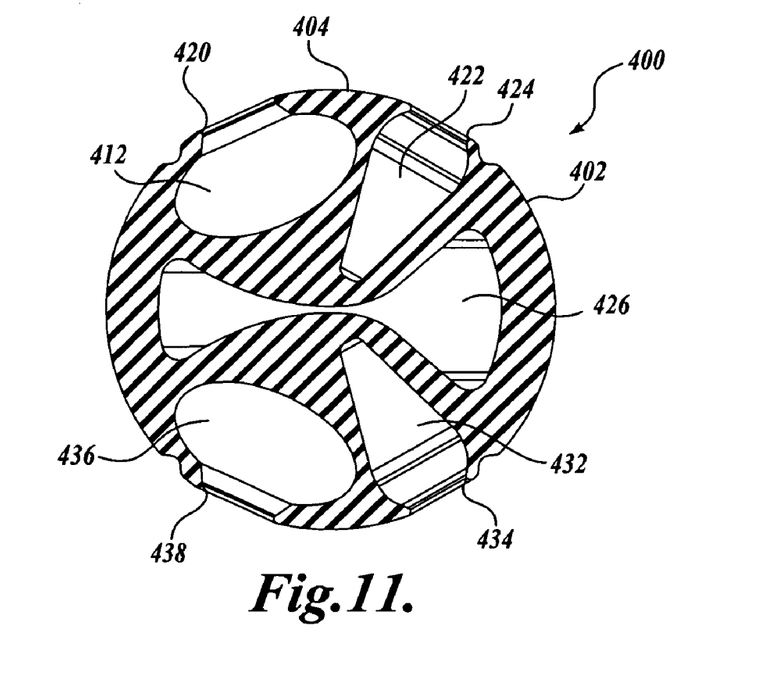
FIG. 11 shows a cross-sectional view of the ball shown in FIG. 10.

A third alternate embodiment is shown in FIGS. 10 and 11. The ball 400 has a body 402 with an outer surface 404 and four chambers 412, 422, 432, and 436 formed therein. Chambers 412 and 436 are formed to have a shape similar to that of the chambers 112 and 122 formed in the ball 100 shown in FIG. 6. Chambers 422 and 432 are formed to have a shape similar to that of the chambers 212 and 222 formed in the ball 200 shown in FIG. 7. Apertures 420, 424, 434, and 438 are formed in the body 402 to put the chambers 412, 422, 432, and 436, respectively, in fluid communication with air outside of the ball 400. When the ball 400 is launched, airflow across the apertures creates a whistling noise. Because the ball 400 includes chambers of different shapes and sizes. The whistling noise created by launching the ball is a combination of the different whistling noises created by the differently sized and shaped chambers.

Like the previously disclosed embodiments, the ball 400 includes a cavity 426 formed in a central portion of the body 402. However, unlike the previously described balls, the ball 400 shown in FIGS. 10 and 11 does not include apertures providing fluid communication between the cavity 426 and the area outside of the ball 400. That is, the cavity 426 is sealed.

Figure 12:
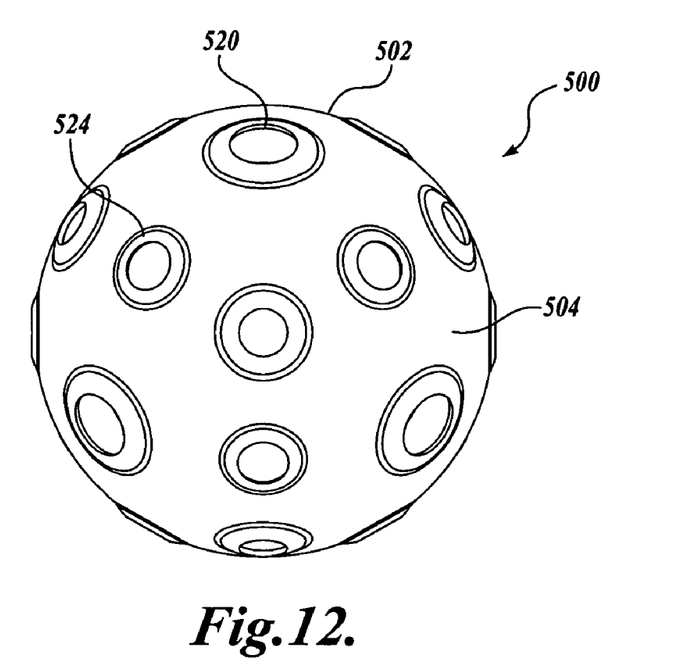
FIG. 12 shows an isometric view of a ball in accordance with a fifth exemplary embodiment of the disclosed subject matter.
Figure 13:
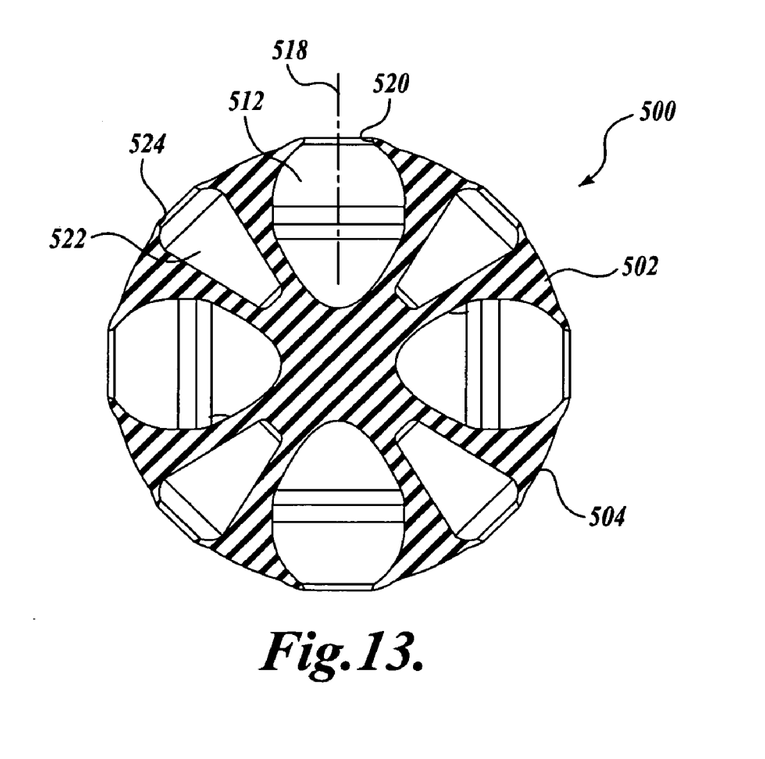
FIG. 13 shows a cross-sectional view of the ball shown in FIG. 12.

Referring to FIGS. 12 and 13, a fourth alternate embodiment is illustrated. The ball 500 includes a body 502 having an outer surface 504. The body 502 includes a plurality of chambers 512 having a first shape formed by rotating a concave curve about an axis of rotation 518. The chambers 512 are evenly spaced within the ball and each chamber 512 is in fluid communication with an area outside of the ball via an aperture 520 formed in the body 502. A second plurality of chambers 522 is also formed within the body 502, each of the chambers 522 having a shape similar to the chambers 212 and 222, illustrated in FIG. 7. Each of the second plurality of chamber 522 is in fluid communication with an area outside of the ball via an aperture 524 formed in the body 502.

The described embodiments are exemplary and should not be considered limiting. It will be appreciated that alternate embodiments are possible wherein the size, shape, location, and number of chambers are varied to produce a particular sound when the ball is launched. Further, as illustrated in several of the disclosed embodiments, chambers having different shapes and sizes can be included in the same ball. Also, the inclusion of a central cavity and/or apertures providing fluid communication between the central cavity and an area outside of the ball are optional. When these features are included, the size, location, and shape of the cavity and the apertures are not limited to those shown in the illustrated embodiments. These and other variations in the configuration of the ball are contemplated and should be considered within the scope of the present disclosure.

As previously discussed, when a ball formed in accordance with the present disclosure is launched, the resulting flow of air over the apertures in the surface of the ball creates a whistling sound. In addition to providing the force to propel the ball along its trajectory, the act of launching the ball will normally impart a spin on the ball. As a result of this spin, the speed and direction of the airflow across a given aperture may be constantly changing. This change in the airflow across the apertures, in turn, causes the sound produced by the ball to quaver or warble. While a quavering or warbling sound may be desirable to some, to others it may be desirable that the ball produce a whistle having a more constant tone. In order to accomplish this, it is advantageous to provide a ball for which the airflow across the apertures is substantially constant when the ball is launched.

One way to minimize variation in the airflow across the apertures of a launched ball is to launch the ball such that the apertures are positioned in a constant position relative to the airflow. This can be accomplished by launching the ball so that the ball rotates about an axis that is normal to the trajectory of the ball. If the ball's axis of rotation is aligned with the apertures formed in the surface of the ball, the air flow over the apertures remains relatively constant.

To maintain the orientation of the axis of rotation of the ball relative to the trajectory of the ball, it may be desirable to increase the gyroscopic stability of the ball. Gyroscopic stability is the property of a rapidly rotating object that tends to keep the object in a constant plane unless acted upon be an external force. Gyroscopic stability results from the angular momentum of the object. Accordingly, increasing the angular momentum of the launched ball will increase the gyroscopic stability of that ball. The angular momentum of a launched ball can be increased by adding a gyroscopic stabilizing feature to the ball. While the gyroscopic stabilizing feature can take many forms, the main property of such a feature is that it increases the density of the ball around the ball's perimeter of rotation. In other words gyroscopic stabilizing feature changes the weigh distribution within the ball such that more of the ball's weight is located further from the axis of rotation.

Figure 14:
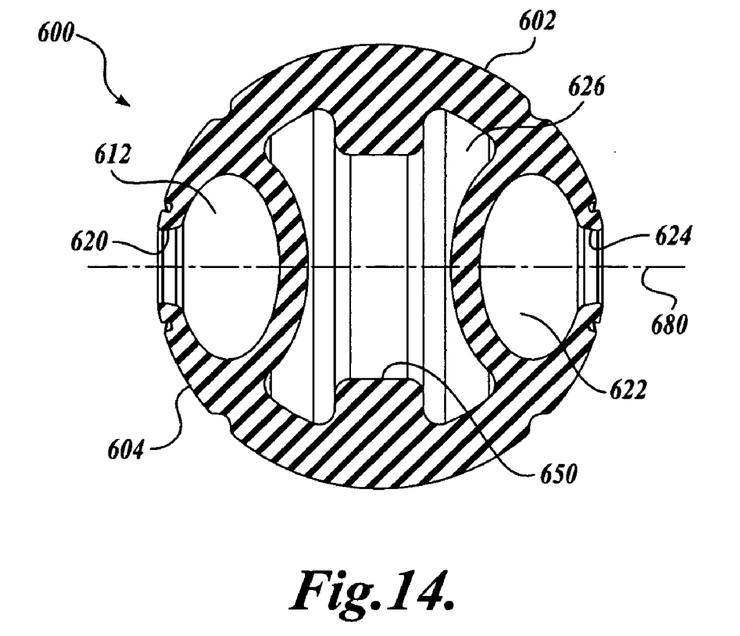
FIG. 14 shows a cross-sectional view of a ball in accordance with a sixth exemplary embodiment of the disclosed subject matter.

FIG. 14 shows a cross-section of one exemplary embodiment of whistling ball having a gyroscopic stabilizing feature in accordance with the present disclosure. The ball 600 is similar to the ball 100 shown in FIGS. 1-6. The ball 600 includes a body 602 having an outer surface 604. The body includes chambers 612 and 622 formed therein and apertures 620 and 624 providing fluid communication between the chambers 612 and 622, respectively, and an area outside of the ball. A cavity 626 is formed in a central portion if the body 602.

In the illustrated embodiment, the gyroscopic stabilizing feature is a protrusion 650 that extends inwardly and radially from the wall of the cavity 626 about the axis of rotation 680 of the chambers 612 and 622. The protrusion 650 increases the amount of the ball's weight that is located away from the axis of rotation of the chambers. Accordingly, when the ball is launched such that the axis of rotation of the ball coincides with the axis of rotation of the chambers 680, the added weight of the protrusion 650 increases the angular momentum and thus, the gyroscopic stability, of the ball. The increased gyroscopic stability makes it more likely that the axis of rotation of the ball will remain substantially perpendicular to the trajectory of the ball. As a result, variations in the airflow across the apertures and the whistling noise produced therefrom will be minimized.

Figure 15:
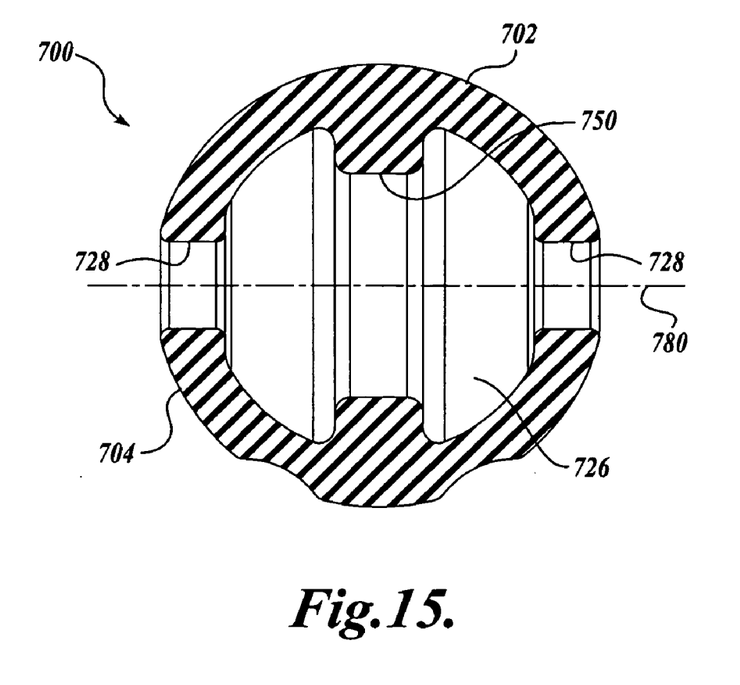
FIG. 15 shows a cross-sectional view of a ball in accordance with a seventh exemplary embodiment of the disclosed subject matter.

FIG. 15 shows a second exemplary embodiment of a whistling ball having a gyroscopic stabilizing feature. The ball 700 comprises a body 702 having a generally spherical outer surface 704. A cavity 726 is formed in a central portion of the body 704. Coaxial apertures 728 are formed in the body to provide fluid communication between the cavity 726 and the air outside of the ball 700. Similar to the gyroscopic stabilizing feature shown in FIG. 14, the gyroscopic stabilizing feature of the ball 700 comprises protrusion 750 extending radially and inwardly from the wall of the cavity 726 about the axis 780 of the apertures 728.

It should be appreciated that the illustrated gyroscopic stabilizing features are exemplary in nature and should not be considered limiting. In this regard, it is contemplated that the gyroscopic stabilizing feature can take various forms. In some embodiments the cross-section of the protrusion can be semicircular, elliptical, or of any other suitable shape. Further, the protrusion need not be continuous around the circumference of the ball, but can instead comprise a plurality of protrusions positioned along the circumference of the ball. In still other possible embodiments, the gyroscopic stabilizing feature is not a discrete protrusion, but is instead a localized thickening of the wall. These and many other variations that increase the angular momentum of a rotating ball are contemplated, and such features should be considered within the scope of the present disclosure.

When the ball 700 is launched, the airflow across the apertures 728 creates a whistling sound. Further, when the ball 700 is launched such that the axis of rotation of the ball coincides with the axis 780 of the apertures 728, the increased gyroscopic stability provided by the weight of the protrusion 750 minimizes variation in the whistling noise created by varying airflow across the apertures 728.

The ball can optionally include one or more visual indicators to help a user orient the axis of rotation when the ball is launched. For example, the teardrop-shaped grooves 108 and 110 shown in FIGS. 1-5 are located at opposite ends of a preferred axis of rotation. Knowing this, a user can orient the ball to be launched so that the grooves 108 and 110 and, therefore, the centers of the apertures are positioned along the axis of rotation that will result from launching the ball. Other possible visual indicators would be words or symbols molded into or printed on the surface of the ball. For example, the word "TOP" could be molded in the ball to indicate the top of the ball when the ball is properly oriented in a launcher. Other words such as "UP," "SIDE," or "BOTTOM," as well as arrows or other indicia could be included on the surface of the ball to indicate a preferred orientation. Similarly, different colors could be applied to the surface or molded into the ball to likewise indicate a preferred orientation to the user.

Figure 16:
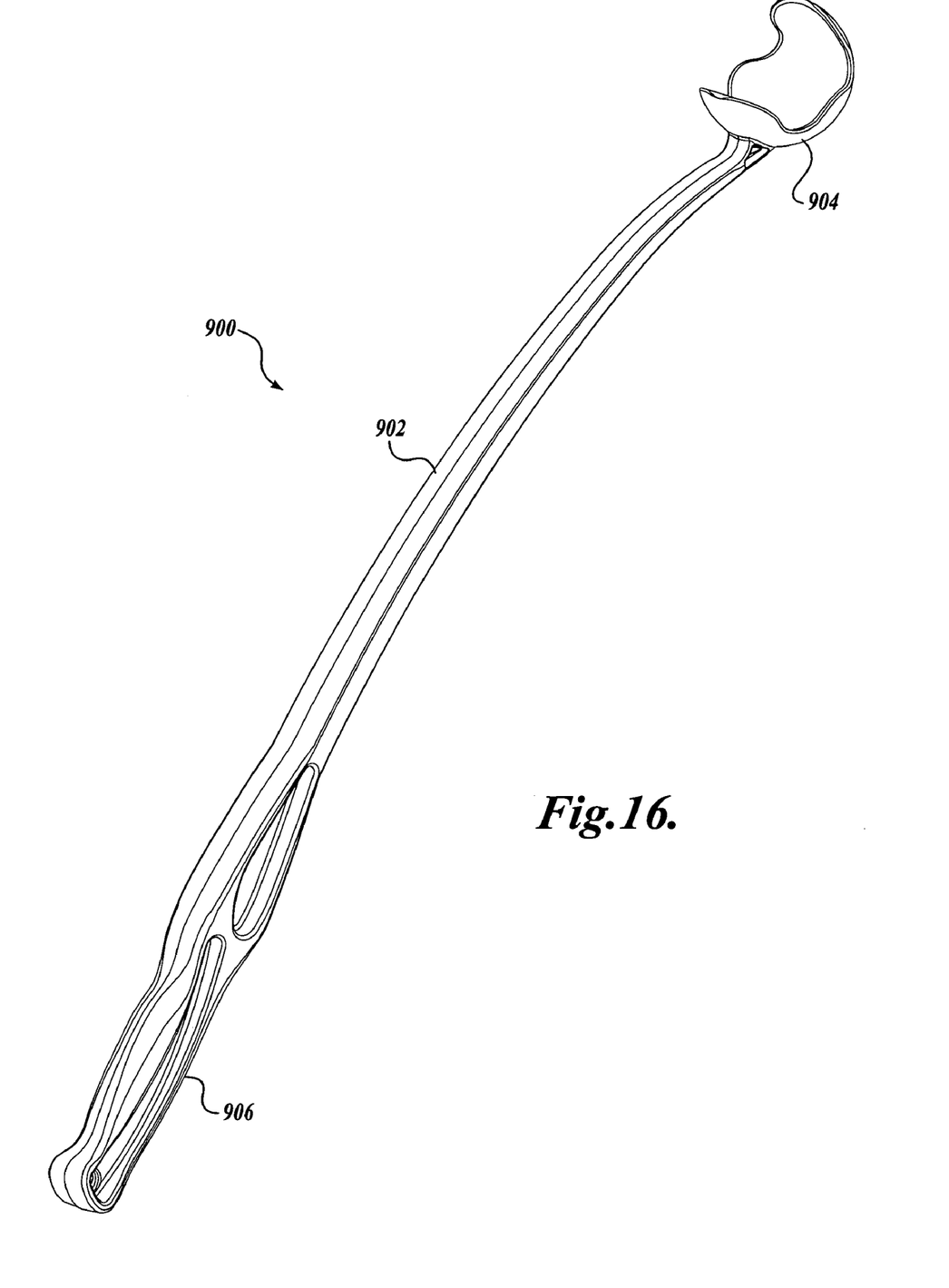
FIG. 16 shows an isometric view of a launcher suitable for use with the disclosed embodiments of a ball.
Figure 17:
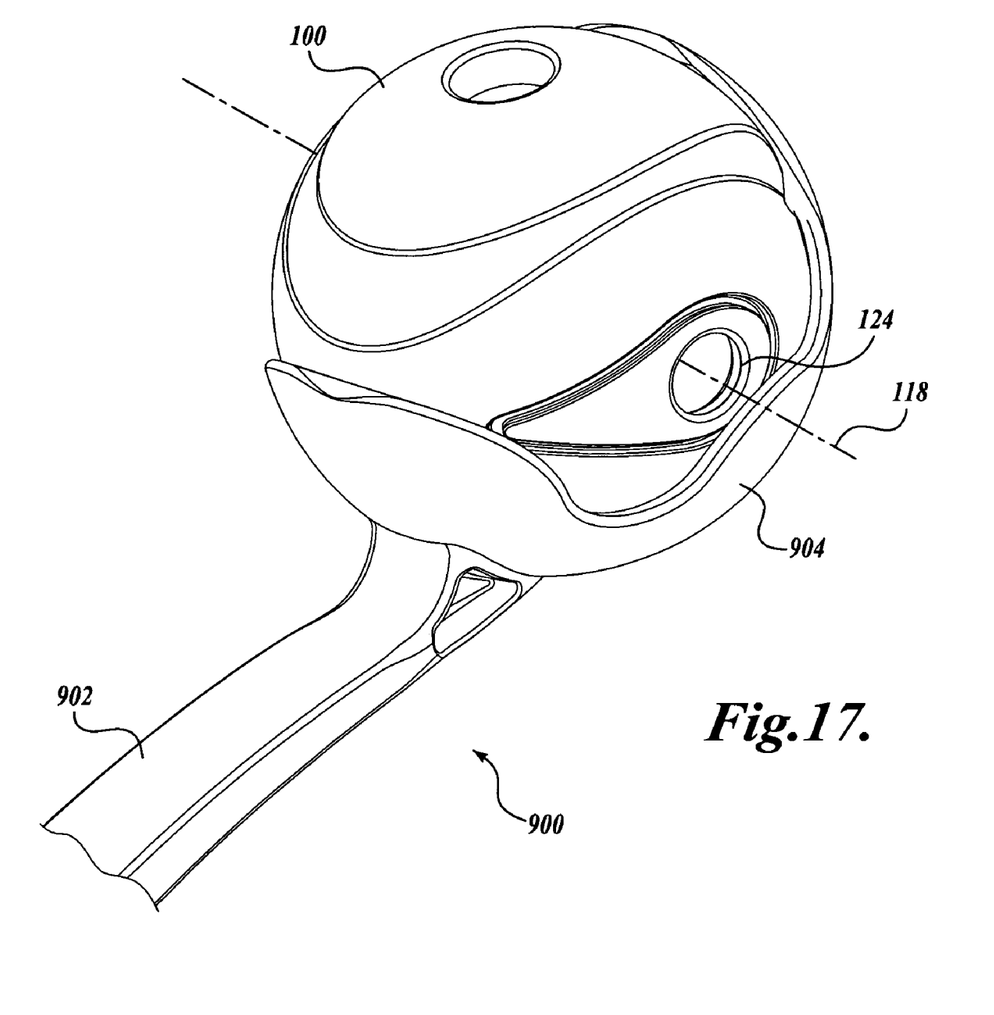
FIG. 17 shows a portion of the launcher shown in FIG. 16 holding the ball shown in FIG. 1.
Figure 18:
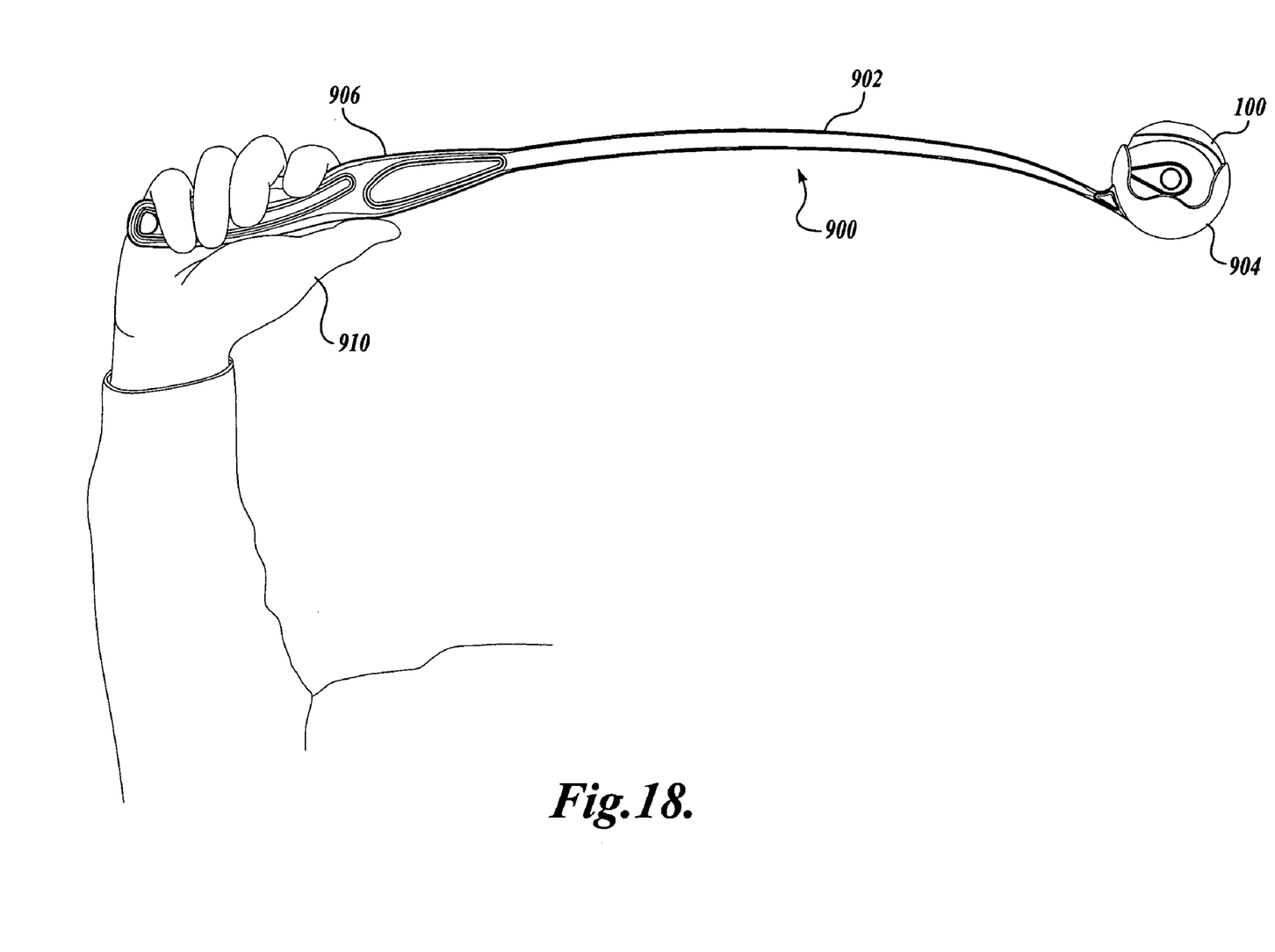
FIG. 18 shows the launcher shown in FIG. 16 in a first launch position.
Figure 19:
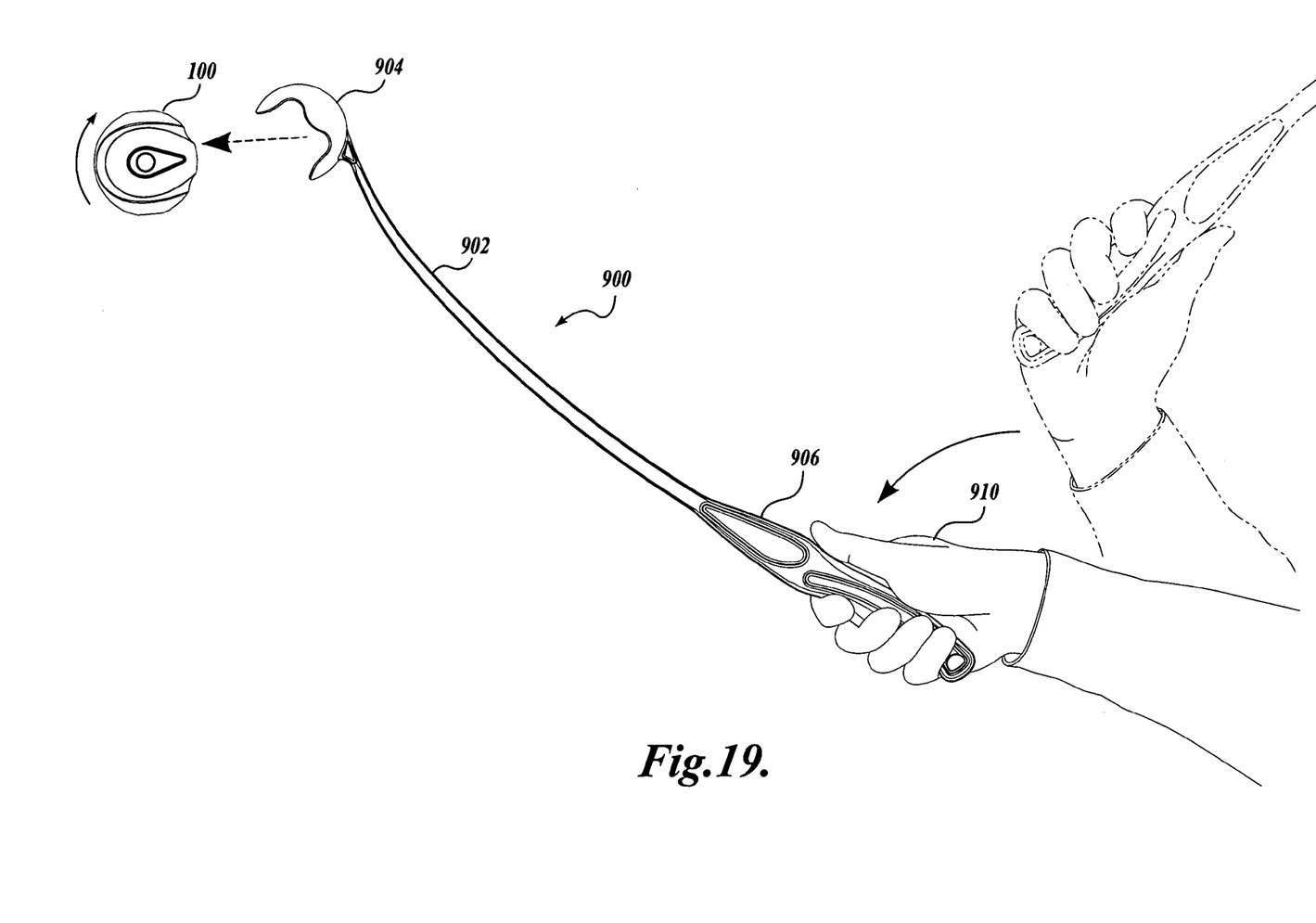
FIG. 19 shows the launcher shown in FIG. 16 in a second launch position.

FIG. 16 shows a launcher 900 suitable for use with the disclosed whistling ball. The launcher 900 includes an elongate body 902 with a holder 904 disposed at one end and a handle 906 disposed at the opposite end. As shown in FIG. 17, the holder 904 is sized and configured to receive a ball 100 therein. The holder 904 preferably retains the ball 100 via a "snap fit." To launch the ball, a user grasps the handle 906 of the launcher 900 with his or her hand 910 and inserts the ball 100 into the holder 904, which retains the ball with the snap fit. The user swings the launcher 900 from a first position (FIG. 18) to a second position (FIG. 19). As the launcher approaches the second position, the momentum of the ball 100 causes the ball 100 to release from the snap fit of the holder 904 and travel along a trajectory. The length of the elongate body 902 effectively increases the moment arm used to accelerate the ball, thus allowing the user to launch the ball farther than would otherwise be possible. Referring to FIG. 17, inserting the ball 100 into the holder 904 such that axis 118 of the apertures is parallel to the axis of rotation of the launched ball, i.e., horizontal and normal to the trajectory of the ball, a constant whistling noise can be achieved.

Although a particular launcher for launching the ball is illustrated and described, the launcher is exemplary and should not be considered limiting. In this regard, any apparatus that provides the user with additional leverage and imparts a spin on the launched ball can be used. Examples of such launchers include, but are not limited to, lacrosse sticks and jai alai baskets.

While illustrative embodiments have been illustrated and described, it will be appreciated that various changes can be made therein without departing from the spirit and scope of the invention.

The invention claimed is:

1. A ball, comprising:
   (a) a body having an outer surface;
   (b) a chamber disposed within the body, the chamber having a concave curvature in at least two orthogonal directions;
   (c) an aperture disposed in the body, the aperture defining a fluid connection between the chamber and the outer surface, wherein a flow of air across the aperture produces a whistling sound; and
   (d) a passageway extending through a cavity formed in a center portion of the ball; wherein a first end of the passageway defines a first opening in the outer surface, and a second end of the passageway defines a second opening opposite the first opening in the outer surface.

2. The ball of claim 1, wherein the body has a substantially spherical shape.

3. The ball of claim 1, wherein the chamber is integrally formed in the body.

4. The ball of claim 1, further comprising a second chamber disposed within the body, the chamber having a concave curvature in at least two orthogonal directions.

5. The ball of claim 4, surface further comprising a second aperture disposed in the body, the second aperture defining a fluid connection between the second chamber and the outer surface, wherein a flow of air across the second aperture produces a whistling sound.

6. A ball, comprising:
   (a) a body having an outer surface;
   (b) a first chamber disposed within the body, the first chamber having a concave curvature in at least two orthogonal directions;
   (c) a first aperture formed in the body, the first aperture defining a fluid connection between the first chamber and the outer surface, wherein a flow of air across the first aperture produces a first whistling sound;
   (d) a second chamber disposed within the body, the second chamber having a concave curvature in at least two orthogonal directions;
   (e) a second aperture formed in the body, the second aperture defining a fluid connection between the second chamber and the outer surface, wherein a flow of air across the second aperture produces a second whistling sound;
   (f) a cavity formed in a center portion of the body;
   (g) a third aperture defining a fluid connection between the cavity and the outer surface; and
   (h) a fourth aperture symmetrically opposed to the third aperture and defining a second fluid connection between the cavity and the outer surface.

7. The ball of claim 6, wherein the body has a substantially spherical shape.

8. The ball of claim 6, wherein the first and second chambers are integrally formed in the body portion.

* * * * *